US012196232B2

(12) United States Patent
Bueter

(10) Patent No.: US 12,196,232 B2
(45) Date of Patent: Jan. 14, 2025

(54) WORKING CYLINDER AND METHOD FOR THE PRODUCTION THEREOF

(71) Applicant: BÜMACH ENGINEERING INTERNATIONAL B.V., TA Emmen (NL)

(72) Inventor: Josef Bueter, Haren/Altenberge (DE)

(73) Assignee: Bümach Engineering International B.V., TA Emmen (NL)

( * ) Notice: Subject to any disclaimer, the term of this patent is extended or adjusted under 35 U.S.C. 154(b) by 0 days.

(21) Appl. No.: 18/548,940

(22) PCT Filed: Feb. 23, 2022

(86) PCT No.: PCT/DE2022/000015
§ 371 (c)(1),
(2) Date: Sep. 5, 2023

(87) PCT Pub. No.: WO2022/184195
PCT Pub. Date: Sep. 9, 2022

(65) Prior Publication Data

US 2024/0151250 A1 May 9, 2024

(30) Foreign Application Priority Data

Mar. 2, 2021 (DE) ..................... 10 2021 001 107.4

(51) Int. Cl.
*F15B 15/14* (2006.01)

(52) U.S. Cl.
CPC ...... *F15B 15/1438* (2013.01); *F15B 2215/30* (2013.01)

(58) Field of Classification Search
CPC .... F15B 15/1438; F15B 2215/30; F16J 13/02
See application file for complete search history.

(56) References Cited

U.S. PATENT DOCUMENTS 4,324,171 A * 4/1982 Gaylord .................. F16J 10/02 92/260
5,487,326 A * 1/1996 Owens ................ F15B 15/1442 92/128
6,276,884 B1 * 8/2001 Bueter .................... F15B 15/14 411/277
(Continued)

FOREIGN PATENT DOCUMENTS

BE 1011346 A3 7/1999
CN 104847892 A 8/2015
(Continued)

*Primary Examiner* — Michael Leslie
(74) *Attorney, Agent, or Firm* — Laurence A. Greenberg; Werner H. Stemer; Ralph E. Locher

(57) ABSTRACT

A working cylinder has a cylinder tube has closure parts arranged at tube ends. The cylinder tube and the closure parts define a cylinder interior. The cylinder has a coupling section that has one of the closure parts, a cylinder tube end and a hollow adapter body. The closure part has an external thread and the adapter body has an internal thread that define a common threaded section constructed to releasably couple the closure part and the adapter body. The cylinder tube end is connected to the adapter body on a cylinder tube side thereof by a ring weld seam. The weld seam defines a sealing plane sealed with respect to a pressure media. The piston unit defines at least one working chamber inside the cylinder.

9 Claims, 3 Drawing Sheets

(56) References Cited

U.S. PATENT DOCUMENTS

| | | | | |
|---|---|---|---|---|
| 6,439,103 | B1 * | 8/2002 | Miller | F15B 15/1438 92/169.1 |
| 6,964,221 | B2 * | 11/2005 | Mickelson | B23P 15/10 92/128 |
| 10,184,501 | B2 | 1/2019 | Nomura | |
| 10,865,815 | B2 * | 12/2020 | Bueter | F16J 15/04 |
| 10,947,998 | B2 * | 3/2021 | Kojima | F15B 15/149 |
| 11,174,881 | B2 | 11/2021 | Kobayashi et al. | |
| 11,534,852 | B2 * | 12/2022 | Nagai | B23K 20/12 |
| 11,953,033 | B2 * | 4/2024 | Bueter | F15B 15/224 |
| 2022/0397129 | A1 * | 12/2022 | Bueter | B23K 33/006 |
| 2022/0397130 | A1 * | 12/2022 | Bueter | B23K 26/28 |

FOREIGN PATENT DOCUMENTS

| | | | |
|---|---|---|---|
| DE | 2511126 | A1 | 9/1976 |
| DE | 112013007048 | T5 | 1/2016 |
| DE | 112018004418 | T5 | 5/2020 |
| DE | 202019004569 | U1 | 3/2021 |
| JP | S58182002 | U | 12/1983 |
| WO | 2013124729 | A1 | 8/2013 |

* cited by examiner

WORKING CYLINDER AND METHOD FOR THE PRODUCTION THEREOF

FIELD AND BACKGROUND OF THE INVENTION

The invention relates to a working cylinder, in particular a hydraulic working cylinder, and a method for the production thereof.

Working cylinders are known as such from the prior art. Generally, the working cylinders have a cylinder tube and closure parts.

According to the state of the art, such working cylinders are usually produced by screwing the closure parts to the cylinder tube. Therefore, these working cylinders are also referred to as screw-type or screwed cylinders in the prior art.

For example, it is known from the state of the art to connect the base closure part with the cylinder tube by MAG welding and then only to screw the guide closure part in place.

The thread of the cylinder tube and closure parts is usually produced by a shape-cutting operation.

Both screw-type cylinders and cylinders with screw connection of only one closure part and MAG welding of the other closure part are provided in high quality according to the state of the art and have proven themselves as premium-quality and reliable products.

It must be noted as a disadvantage from the point of production that an increase in the material thickness, i.e. in the tube wall thickness, must be provided for the thread to be inserted subtractively, because the thread inevitably weakens the cylinder tube. However, this results in a tube wall thickness that is considerably overdimensioned for absorbing the forces during operation, especially the forces caused by the operating pressure of the fluid. This leads disadvantageously to increased material consumption and to an increased final weight of the working cylinder. Furthermore, machining the comparatively long cylinder tubes is intricate in terms of production. In addition, it is difficult from the point of production to match the threads of the closure parts and the cylinder tube to each other such that, in the case of a desired special angular position of the closure parts relative to each other or to the cylinder tube, a suitable tightening torque is applied when screwing.

SUMMARY OF THE INVENTION

It is the object of the invention to provide a working cylinder which is highly reliable and can be produced and demounted in a cost-effective manner. Moreover, it is the task of the invention to disclose a method for producing such a working cylinder.

The task with respect to the working cylinder is solved by the features listed in an independent claim and with respect to the method for producing such a working cylinder by the features listed in a dependent claim. Preferred further developments result from the respective sub-claims dependent claims.

The working cylinder according to the invention comprises a cylinder and a piston unit as basic elements and is characterized in particular by a special coupling section.

The cylinder of the working cylinder according to the invention comprises a cylinder tube, a closure part and a further closure part.

As is known per se, the cylinder tube comprises a cylinder tube end and a further cylinder tube end and thus has two opposite cylinder tube ends. The closure part is provided at the cylinder tube end and the further closure part is provided at the further cylinder tube end. Hereinafter, the cylinder tube end and the further cylinder tube end are also referred to collectively as the cylinder tube ends, and the closure part and the further closure part are also referred to collectively as the closure parts. The cylinder tube and the closure parts provided thereon form a cylinder interior.

The piston unit forms at least one working chamber in the cylinder interior. The piston unit is preferably designed as an assembly of piston and piston rod, wherein the piston rod slidably passes through one of the closure parts, which is then a guide closure part. However, the piston unit can also be provided, for example, as a plunger piston or as a piston unit of a cylinder which has a continuous piston rod and thus two equally large effective surfaces for extending and retracting.

The working cylinder according to the invention is also characterized by a specifically designed coupling section.

According to the invention, the coupling section comprises the closure part, the cylinder tube end and a hollow cylindrical adapter body.

The closure part has an external thread and the adapter body has an internal thread. The external thread and the internal thread are designed to correspond to each other and are in engagement with each other in an intended final assembled state. In this state, they form a common threaded section which is designed to releasably couple the closure part and the adapter body.

Furthermore, the coupling section is characterized in that the end of the cylinder tube is positively connected to the adapter body at one end of the adapter body on the cylinder tube side by means of a circumferential ring weld seam. The ring weld seam forms a plane which is tight against pressure media.

Thus, in a final assembled state, the adapter body practically forms a longitudinal continuation of the cylinder tube, wherein the inner diameters and the outer diameters of the adapter body and of the cylinder tube are the same but the inner diameters and/or the outer diameters can also differ from each other.

The working cylinder according to the invention has in particular the advantages described in the following.

Compared to the cylinder tube, the adapter bush can be machined much more economically due to its smaller axial dimensions. This applies in particular for cutting the internal thread. Usually, the length of the adapter body can be considerably smaller than its diameter. The adapter body is preferably made of a tube material which is available as a so-called ready-made rod article. In particular, cutting-to-length processes, clamping processes and handling can be carried out much faster than it is the case with a comparatively much longer cylinder tube. In addition, processing machines with significantly smaller processing spaces can be used and are correspondingly less cost-intensive and, moreover, they require less installation space due to their smaller design.

As a further advantage, the angular position of the closure parts can be adjusted freely and precisely. In contrast to a screw-type working cylinder, the adjustment of the angular position is not related to the tightening torque when screwing. This means that the angular position can be freely selected. In addition, the angular position can be precisely adjusted in a particularly easy manner because possible elastic torsional deformations of the cylinder tube do not occur and do not have to be taken into account contrary to screw mounting a screw-type working cylinder.

At the same time, as a special advantage, the adapter bush can be mounted with an optimized tightening torque. Since the angular position of the adapter bush relative to the closure part does not have to be taken into account, the screw connection can be made exactly with the desired tightening torque. This fact allows to use a cost-effective metallic seal.

Furthermore, there is an assembly advantage in that any protection element for the adapter body against unscrewing can be installed without the cylinder tube already being mounted. This offers both an advantage in handling due to the comparatively small dimensions of the pre-assembly consisting of the closure part and the adapter body and the advantage that any associated contamination of the cylinder interior is avoided.

Furthermore, the wall thickness of the adapter body does advantageously not depend on the wall thickness of the cylinder tube. In particular, the wall thickness of the cylinder tube can be selected to be smaller because, contrary to a screw-type working cylinder according to the state of the art, the cylinder tube is not weakened in its wall cross-section by the thread. Conversely, the wall thickness of the adapter body can be selected to be greater relative to the wall thickness of the cylinder tube in order to be capable to reliably absorb the loads in the threaded area.

Furthermore, it is advantageous compared to a weld-type working cylinder according to the state of the art that the material pairing for the welding is no longer necessarily determined by the material of the closure part. Rather, a material pairing to the material of the cylinder tube can be optimized by selecting a suitable material of the adapter body.

In the same way, it is advantageous to optimize the material of the adapter body, as it is not fixed by the material of the cylinder tube. Rather, a material more suitable for machining can be selected.

As an advantage, comparatively expensive material for the cylinder tube is saved because its length is reduced by the length of the adapter body.

A further significant advantage is the fact that the working cylinder according to the invention, in contrast to a weld-type working cylinder, remains demountable and thus it can be maintained and repaired. In this aspect, it is also advantageous that the angular position of the closure parts relative to each other can be provided again with substantially the same tightening torque even after reassembly, since the angular position between the adapter body and the cylinder tube is maintained due to the permanent welded connection.

Thus, the working cylinder according to the invention combines the advantages of a screw coupling with those of a laser welding coupling or, to put it in other words, the advantages of a weld-type working cylinder with those of a screw-type working cylinder.

According to a first advantageous further development, the closure parts of the working cylinder each have a laterally arranged pressure medium connection.

This advantageous further development is based on the fact that, many applications need working cylinders that must have pressure fluid connections for both working chambers arranged laterally at the closure parts, and an application-tailored specific angular position around the main longitudinal axis is required for both pressure fluid connections. The angular position can, for example, be required at 0 degrees, i.e. in one line, or at 180 degrees, i.e. opposite. However, all other possible angular positions may also be required.

In this aspect, the working cylinder according to the invention provides an advantageous solution, since after mounting the adapter body, the cylinder tube with the further closure part can be free-rotatably aligned around its main longitudinal axis and welded to the adapter body in this angular position.

According to another further development, the ring weld seam is formed as a laser weld seam.

According to this further development, a welded joint is provided with only low energy input per unit length. For example, in comparison to MAG welding, which is common in the state of the art, this results in only slight heating of the pre-assembly consisting of the closure part and the adapter body so that seals or guides that have already been mounted are not damaged.

According to a continuative further development, the ring weld seam has a ring weld seam depth that has a ratio of 1.1 to 2.5 relative to a cylinder tube wall thickness.

In this further development, the ring weld seam has an inclination relative to the transverse plane which is orthogonal to the main longitudinal axis. This results in a depth of the ring weld seam that exceeds the cylinder tube wall thickness, and depending on the angle of inclination it is 1.1 to 2.5 times the cylinder tube wall thickness. This is particularly advantageous for providing a larger connection surface and thus a higher strength of the positive substance connection between the adapter body and the cylinder tube.

According to another continuative development, the ring weld seam has a ring weld seam centre axis which has a ring weld seam inclination angle alpha of 20 to 70 degrees relative to a main longitudinal axis of the cylinder tube.

The centre axis of the ring weld seam, the cross-section of which is V-shaped, is inclined relative to the transverse plane and includes, to it, the ring weld seam inclination angle alpha of 20 to 70 degrees. It has been found that an inclination in this range on the one hand achieves an additional increase in strength because the components of the multi-axial load on the weld seam due to tensile stresses and buckling stresses are advantageously distributed by the inclination, and on the other hand there is an appropriately low energy input per unit length to avoid undesirable excessive heating during welding.

According to another further development, the adapter body wall thickness is greater than the cylinder tube wall thickness. In addition, the adapter body has an overlapping section which radially overlaps the cylinder tube at its cylinder tube end.

An overlapping section in the sense of this further development is understood to be a geometry of the adapter body and cylinder tube in which, viewed in the eccentric direction, a section of the adapter body is arranged radially above the cylinder tube. For example, the overlap can be designed in such a way that a section of the adapter body lies above the cylinder tube like a surrounding ring. It is also possible that the adapter body and the cylinder tube each have an inclined flank, wherein the flank of the adapter body lies radially above the flank of the cylinder tube.

In any case, according to this further development, an elastic expansion of the cylinder tube caused by the pressure of the pressure medium, hereinafter referred to as a bulge, is limited by the overlap. Thus, the coupling between the adapter body and the cylinder tube advantageously receives, in addition to the positive substance connection, a positive force transmission component and thus a relief of the ring weld seam.

Furthermore, according to another advantageous further development, the adapter body end on the closure part side has a tapered wall section. The tapered wall section has an axial ring surface and the closure part has an axial ring counter-surface, wherein the axial ring surface and the axial ring counter-surface are in positive pressure contact with one another in a coupling state and form a circumferential pressure contact surface. The pressure contact surface forms a sealing plane. The sealing plane prevents the escape of a pressure medium out of the working chamber at the coupling between the adapter body and the closure part. The positive pressure contact is effectuated by the generation of an axial force due to the screwing of the adapter body and the closure part.

According to this further development, a surface pressure in the area of the pressure contact surface leads to a deformation of the adapter body and the closure part, which is within an elasticity limit both without and with pressurization of a pressure medium.

The pressure contact between the ring surface and the ring counter-surface results in a surface pressure at the pressure contact surface. This surface pressure in turn causes a deformation of the adapter body, in particular of its tapered wall section, as well as of the closure part. According to this further development, the effected deformation lies within an elasticity limit both without pressurization and with pressurization of a pressure medium. The elasticity limit is determined by the materials of the adapter body and the closure part. In the event that the adapter body and the closure part are made of different materials, different elasticity limits must be taken into account correspondingly.

In the case of high pressurization, considerable forces are acting axially on the inside of the closure part. This causes a slight axial change in position of the closure part relative to the adapter body. When pressure is not applied, the slight axial position change takes place in the opposite direction. The axial position change has an effect on the degree of deformation of the coupling partners in the areas adjacent to the pressure contact surface. Thus, the deformation is less at high pressures than at lower pressures. At the same time, the surface pressure is less when high pressure is applied compared to the situation in which lower pressure is applied.

Since the deformation that occurs is limited exclusively to the elastic range in all pressurization states according to the invention, it is completely reversible when the operating condition is changed by pressurization and by the discontinuation of pressurization. According to the invention, it is ensured for all operating conditions that the pressure contact and the effectuated surface pressure of the pressure contact surface provide the formation of the sealing plane and thus a sufficient seal between the adapter body and the closure part.

In this context, the term pressurization covers the entire range of values from any minimum pressure to a maximum permissible pressure of the pressure medium. Even at the maximum pressure, a sufficient axial force remains on the sealing pressure contact surface so that the function of the working cylinder is maintained.

The axial ring surface and the axial ring counter-surface are preferably arranged in a plane which is substantially orthogonal to the longitudinal axis.

It is particularly advantageous here that thanks to the working cylinder designed according to the invention, firstly, in deviation from the material of the cylinder tube, a particularly suitable material pairing of the adapter body and the closure part with suitable moduli of elasticity can be selected and, secondly, the deformation of the tapered wall section and of the corresponding closure part section can be set exactly to the desired degree within the elasticity limits by means of a tightening torque that is independent of an angular position.

According to another advantageous further development, the working cylinder has a further coupling section. This coupling section comprises the further closure part, the further cylinder tube end and a further hollow cylindrical adapter body and is designed analogously to the coupling section described. Specifically, the further closure part has a further external thread and the further adapter body has a further internal thread corresponding to the further external thread so that the further external thread and the further internal thread form a further common threaded section which is designed to releasably couple the further closure part and the further adapter body end. In addition, the further end of the cylinder tube is connected to the further adapter body at a further end of the adapter body on the cylinder tube side by means of a further circumferential ring weld seam and the further ring weld seam forms a further sealing plane which is tight against pressure media.

The contents of the description of the coupling section also apply to the further coupling section in a supplementary manner.

According to this further development, the working cylinder has the special coupling according to the invention to both closure parts. This further development is advantageous in particular cases in which a releasability of the coupling is to be provided for both closure parts, or in which special components are to be arranged at the cylinder tube, such as position sensors in which a defined angular position is to be set both with respect to the first closure part, here referred to as the closure part, and with respect to the second closure part, here referred to as the further closure part.

According to a further aspect, the invention relates to a method of producing a working cylinder according to the invention.

The method according to the invention comprises the following process steps:

a) Screwing the adapter body onto the closure part
b) Applying a torque to the adapter body and providing a pre-assembly consisting of the closure part and the adapter body
c) Positioning the cylinder tube with its cylinder tube end at the adapter body end on the cylinder tube side
d) Producing the circumferential ring weld seam.

In the following, the process steps are described in more detail.

a) Screwing the adapter body onto the closure part

In process step a), the external thread of the closure part and the internal thread of the adapter body are engaged with each other. Then, screwing is carried out so that the common thread section is formed. Screwing is continued until the adapter body end on the closure part side rests against the closure part.

b) Applying a torque to the adapter body and providing a pre-assembly consisting of the closure part and the adapter body end In process step b), the screwing movement is continued by applying a torque that can be defined by the user. Here, in particular, a desired elastic deformation of the pressure contact areas of the closure part and the adapter body can be set.

Thus, in process step b), a pre-assembly comprising the closure part and the adapter body is obtained.

Optionally, it is possible to provide a protection element against unscrewing immediately after process step b) or also after a later process step, which prevents loosening of the screw connection between the adapter body and the closure part.

c) Positioning the cylinder tube with its cylinder tube end at the adapter body end on the cylinder tube side In step c), the cylinder tube is brought into the desired relative position to the adapter body. Preferably, the adapter body has such a length that the closure part protrudes axially so that the cylinder tube can be pushed onto this axial protrusion and thus be centred.

d) Producing the circumferential ring weld seam

In process step d), the circumferential ring weld seam is produced. Preferably, this is a laser weld seam. During welding, the cylinder tube and the pre-assembly are held in a fixed relative positional relationship. As a result of process step d), the coupling section is completed. Unless, in a special further development, a coupling section according to the invention is also produced as a further coupling section at the opposite cylinder end to the further closure part, the working cylinder is closed after process step d). Then, further process steps, such as painting, can be carried out.

According to an advantageous further development of the method, the method comprises a process step c1) after the process step c).

c1) Aligning the cylinder tube in an angular position around the main longitudinal axis relative to the pre-assembly In process step c1), the cylinder tube is aligned, in addition to the other degrees of freedom, in the rotational degree of freedom of the rotation around the central main longitudinal axis of the working cylinder. This adjusts the angular position of the cylinder tube relative to the closure part. This is based on the fact that the further closure part is usually already coupled to the cylinder tube by welding. Thus, the angular position of the closure parts relative to each other can be determined at the same time.

The invention is explained as an embodiment in more detail by means of the following figures.

DETAILED DESCRIPTION OF THE INVENTION

Figure 1:
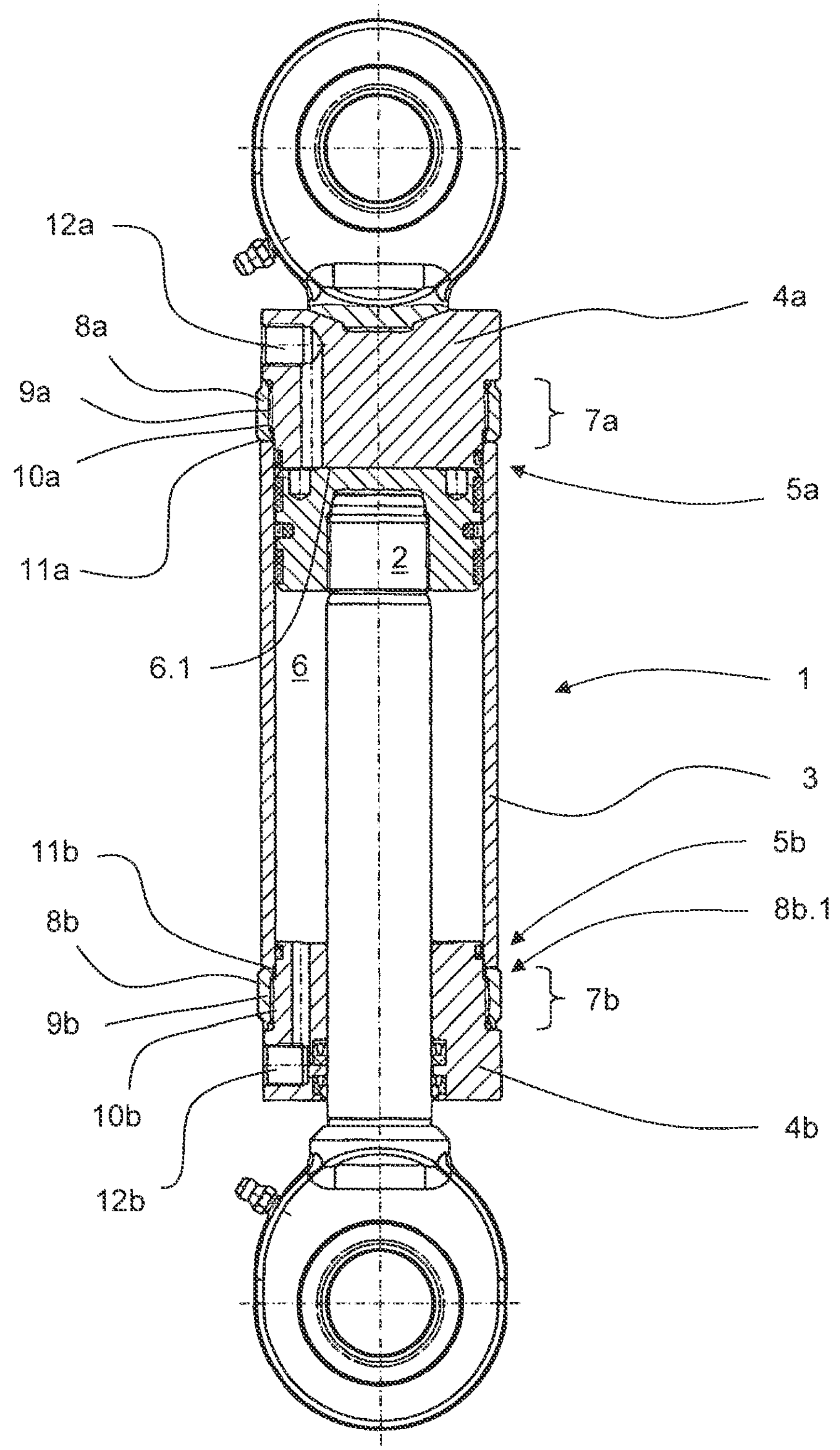
FIG. 1 Sectional view of a working cylinder with two coupling sections

It is noted that the same reference numerals in the various figures always refer to the same features or components. The reference numerals are also used in the description if they are not shown in the respective figure.

FIG. 1 shows an exemplary embodiment of a working cylinder according to the invention in a sectional view. The exemplary embodiment is a differential working cylinder. In this exemplary embodiment, the working cylinder additionally has a further coupling section 7*b*.

The working cylinder is composed of the cylinder 1 and the piston unit 2. The cylinder tube 3 has the opposed cylinder tube ends 5*a* and 5*b*. Together with the closing parts 4*a* and 4*b*, the interior 6 is formed. In addition, the at least one working chamber 6.1, here the main working chamber, is formed between the piston of the piston unit 2 and the closure part 4*a*, which is provided in the form of a base closure part here. The piston unit 2 is in the retracted position so that the working chamber 6.1 is closed. The maximally opened piston rod chamber (without reference numeral), which is delimited by the further closure part 4*b* as a guide closure part, is located opposite as a further working chamber. Hydraulic fluid is supplied to the working chamber 6.1 via the pressure medium connection 12*a* and to the piston rod chamber via the further pressure medium connection 12*b*.

The coupling section 7*a* comprises the closure part 4*a*, the adapter body 8*a* and the cylinder tube end 5*a*.

The closure part 4*a* has an external thread 9*a* and the adapter body 8*a* has an internal thread 10*b*. The threads 9*a* and 10*a* are designed to correspond to each other and to engage with each other. The adapter body 8*a* is releasably coupled to the closure part 4*a* by screwing by means of the threads 9*a*, 10*a*. The cylinder tube 3 is connected with its cylinder tube end 5*a* to the adapter body 8*a* by the ring weld seam 11*a*.

The structure and function of the further coupling section 7*b* with the further closure part 4*b*, the further adapter body 8*b*, the further threads 9*b* and 10*b* as well as the further ring weld seam 11*b* at the further cylinder tube end 5*b* correspond to the coupling section 7*a*. Therefore, the description sections for the coupling section 7*a* also apply to the further coupling section 7*b* in a corresponding manner. In the exemplary embodiment, the working cylinder can be demounted at both ends due to the two coupling sections 7*a* and 7*b*.

Figure 2:
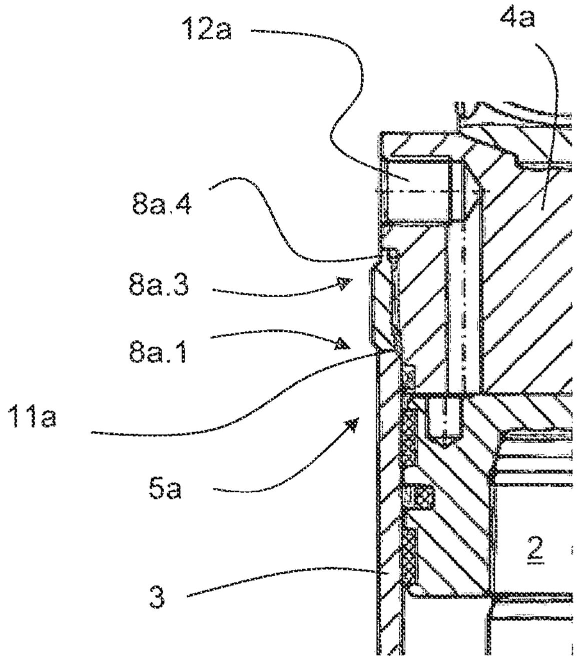
FIG. 2 Enlarged detail of the working cylinder

FIG. 2 shows the area of the coupling section 7*a* as a detail in an enlarged section. The coupling area between the adapter body 8*a* and the closure part is shown in further detail in FIG. 3 so that FIG. 2 and FIG. 3 are explained together.

Figure 3:
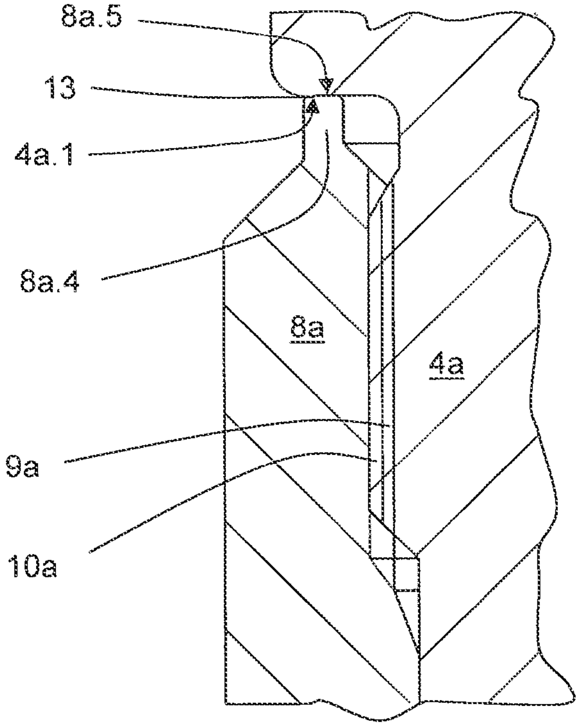
FIG. 3 Enlarged detail of the coupling section with wall taper

In the embodiment according to FIGS. 2 and 3, the adapter body 8*a* has a tapered wall section 8*a*.4. This section has the axial ring surface 8*a*.5 in the direction of the closure part 4*a* and, opposite in the direction of the adapter body 8*a*, the closure part 4*a* has the axial ring counter-surface 4*a*.1. Both ring surfaces 8*a*.5 and 4*a*.1 together form the pressure contact surface 13. This surface is subject to an axial force effectuated by the screw connection of the external thread 9*a* and the internal thread 10*a*, which causes an elastic deformation of the adapter body 8*a* and the closure part 4*a* in the area around the pressure contact surface 13.

Figure 4:
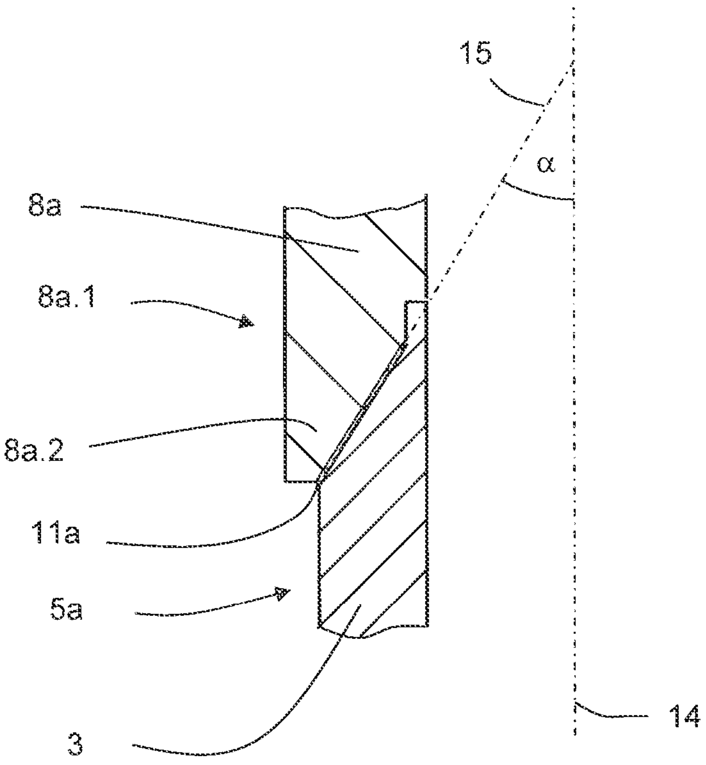
FIG. 4 Enlarged detail of a coupling section with overlapping section and inclined ring weld seam.

FIG. 4. shows the area of the coupling section 7*a* in the area of the ring weld seam 11*a* as a detail in an enlarged section. In this exemplary embodiment, the adapter body 8*a* overlaps the cylinder tube 3 at its cylinder tube end 5*a* by means of an overlap section 8*a*.2.

In addition, the ring weld seam 11*a* is inclined and its ring weld seam centre axis 15 encloses a ring weld seam inclination angle $\alpha$ with respect to the main longitudinal axis 14 of the working cylinder, which is 30 degrees in the exemplary embodiment. Due to the overlap, the adapter body 8*a*, which also has a greater material thickness than the cylinder tube 3 in this case, additionally supports the coupling by means of the ring weld seam 11*a* and, in particular, reliably absorbs buckling forces when the pressure medium is pressurized during the operation of the working cylinder.

LIST OF REFERENCE NUMERALS

1 cylinder
2 piston unit
3 piston rod
4*a* closure part
4.*a*.1 axial ring counter-surface
4*b* further closure part

5*a* cylinder tube end
5*b* further cylinder tube end
6 cylinder interior
6.1 working chamber
7*a* coupling section
7*b* further coupling section
8*a* adapter body
8*a*.1 adapter body end on the cylinder tube side
8*a*.2 overlapping section
8*a*.3 adapter body end on the closure part side
8*a*.4 tapered wall section
8*a*.5 axial ring surface
8*b* further adapter body
8*b*.1 further adapter body end on the cylinder tube side
9*a* external thread
9*b* further external thread
10*a* internal thread
10*b* further internal thread
11*a* ring weld seam
11*b* further ring weld seam
12*a* pressure medium connection
12*b* further pressure medium connection
13 pressure contact surface
14 main longitudinal axis
15 centre axis of ring weld seam
α ring weld seam inclination angle alpha

The invention claimed is:

1. A working cylinder, comprising:

a cylinder having a cylinder tube, a closure part and a further closure part, said cylinder tube having a cylinder tube end and a further cylinder tube end, said closure part is arranged at said cylinder tube end and said further closure part is arranged at said further cylinder tube end, said cylinder tube and said closure parts defining a cylinder interior, said cylinder having a coupling section including said closure part, said cylinder tube end and a hollow cylindrical adapter body, said closure part having an external thread and said adapter body having an internal thread corresponding to said external thread and defining a common threaded section constructed to releasably couple said closure part and said adapter body, said cylinder tube end being positively connected to said adapter body at an adapter body end on a cylinder tube side thereof by a circumferential ring weld seam and said ring weld seam defining a sealing plane being sealed tight with respect to a pressure media in the cylinder;

said further closure part at said further cylinder tube end defining a further coupling section including a further hollow cylindrical adapter body, said further closure part having a further external thread and said further adapter body having a further internal thread corresponding to said further external thread and defining a common threaded section constructed for releasably coupling said further closure part and said further adapter body, said further cylinder tube end having an appositive substance connection to said further adapter body at a further adapter body end on a further cylinder tube side provided by a further circumferential ring weld seam and said further ring weld seam defining a further sealing plane sealed tight with respect to the pressure media;

a piston unit defining at least one working chamber in said cylinder interior.

2. The working cylinder according to claim 1, wherein said closure parts each have a respective laterally arranged pressure medium connection.

3. The working cylinder according to claim 1, wherein said ring weld seam is a laser weld seam.

4. The working cylinder according to claim 1, wherein said ring weld seam has a ring weld seam depth which has a ratio of 1.1 to 2.5 with respect to a cylinder tube wall thickness.

5. The working cylinder according to claim 1, wherein said ring weld seam has a ring weld seam center axis which has a ring weld seam inclination angle of 20 to 70 degrees with respect to a main longitudinal axis of said cylinder tube.

6. The working cylinder according to claim 1, wherein an adapter body wall thickness is greater than a cylinder tube wall thickness and said adapter body has an overlapping section which radially overlaps said cylinder tube at said cylinder tube end.

7. The working cylinder according to claim 1, wherein said adapter body end on a closure part side thereof has a tapered wall section, said tapered wall section has an axial ring surface and said closure part has an axial ring countersurface, said axial ring surface and said axial ring countersurface are in positive pressure contact with each other in a coupling state and define a circumferential pressure contact surface, and said pressure contact surface defines a sealing plane, a surface pressure in the area of said pressure contact surface results in a deformation within an elasticity limit of said adapter body and of said closure part both without and with pressurization of a pressure medium.

8. A method of producing a working cylinder according to claim 1, comprising the following process steps:

a) screwing the adapter body onto the closure part;

b) applying a torque to the adapter body and providing a pre-assembly consisting of the closure part and the adapter body;

c) positioning the cylinder tube with the cylinder tube end at the adapter body end on the cylinder tube side; and d) producing the circumferential ring weld seam.

9. The method of producing a working cylinder according to claim 8, comprising:

after the process step c), a process step c1) of aligning the cylinder tube in an angular position around the main longitudinal axis relative to the pre-assembly.

* * * * *